United States Patent [19]

Powis

[11] Patent Number: 4,674,475
[45] Date of Patent: Jun. 23, 1987

[54] GAS FIRED FURNACE

[75] Inventor: William N. Powis, Mercer, Pa.

[73] Assignee: FL Industries, Inc., Livingston, N.J.

[21] Appl. No.: 794,244

[22] Filed: Oct. 31, 1985

[51] Int. Cl.⁴ ............................................. F24H 3/04
[52] U.S. Cl. ............................. 126/110 C; 126/92 C;
  126/110 A; 126/110 B; 432/222
[58] Field of Search ............ 126/92 C, 110 B, 110 C,
  126/110 D, 114, 116 R, 110 A; 432/222

[56] References Cited

U.S. PATENT DOCUMENTS

| | | | |
|---|---|---|---|
| 2,738,181 | 3/1956 | White | 126/110 B X |
| 2,836,409 | 5/1958 | Harrison | 432/222 X |
| 3,593,969 | 7/1971 | Smithson et al. | 126/110 C X |
| 4,053,279 | 10/1977 | Eichenlaub | 432/222 |
| 4,373,912 | 2/1983 | Mitchell | 432/222 |
| 4,429,679 | 2/1984 | Dirkes | 126/110 A |
| 4,573,912 | 3/1986 | Albritton et al. | 432/222 |

Primary Examiner—Samuel Scott
Assistant Examiner—Allen J. Flanigan
Attorney, Agent, or Firm—Elliot M. Olstein; Raymond J. Lillie

[57] ABSTRACT

A direct-fired make-up furnace comprises a cabinet which houses an air blower. A gas fired burner located in a sloped passage, which is formed by walls of a return air compartment and a by-pass air compartment, radiates heat at an angle relative to the blower. The return air compartment substantially blocks direct radiation of the burner. An exit opening of the by-pass air compartment is located between the burner and the blower.

22 Claims, 1 Drawing Figure

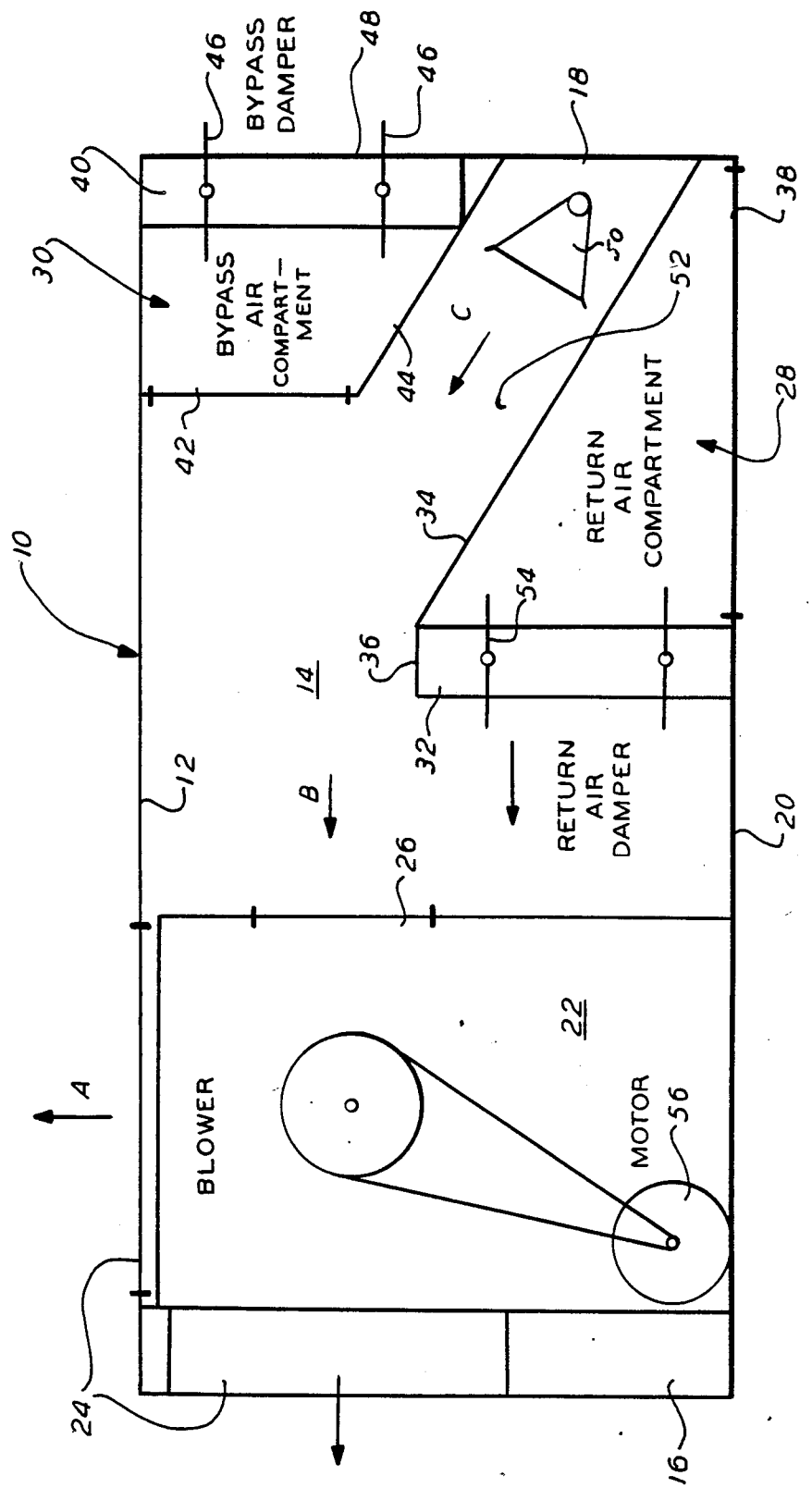

GAS FIRED FURNACE

BACKGROUND OF THE INVENTION

1. Field of the Invention

This invention pertains to gas fired furnaces and more particularly to direct-fired make-up air furnaces.

2. Background Information

Conventional direct-fired make-up air furnaces have a significantly large cabinet which accommodates a blower, a burner, various ducts, and air flow control elements. One of the reasons why such cabinets are made so large is the necessity of installation of large dampers regulating the volume of air flow entering the cabinet. Dampers require the space for a frame support structure, an air duct or plenum connected to the damper and the remaining ductwork, and a valve operating mechanism. Also, additional space is needed in order to separate the motor of an air blower from the radiant heat emanating from a gas burner.

If the motor is located too close to the burner, the motor will become overheated in a short period of time. Therefore, it has been a common practice to locate the motor outside the burner compartment in order to prevent the motor overheating.

A furnace constructed in accordance with the subject invention reduces the size of a conventional furnace cabinet by approximately 20%, thereby saving the space which may be critical under certain circumstances and costs associated with unnecessary sheet metal. The new furnace provides a more streamlined and aesthetically appealing structure without sacrifice of furnace efficiency.

A more detailed description of the novel furnace is set forth hereinbelow.

SUMMARY OF THE INVENTION

The subject invention provides for an air furnace which comprises a cabinet with an air blower mounted on the cabinet. A return air compartment, formed by an air damper and an enclosure wall, substantially blocks direct heat radiation of the blower motor. The heat radiating from the burner warms the air entering the blower. The heated air is guided by a sloped enclosure wall toward the blower.

BRIEF DESCRIPTION OF THE DRAWING

The drawing shows a schematic side view of an air furnace in accordance with the subject invention.

DESCRIPTION OF THE PREFERRED EMBODIMENT

The invention may be carried into practice in a number of ways but one specific embodiment will be described by way of example only.

Referring now to the drawing, a direct-fired make-up air furnace comprises a cabinet 10, which has a top wall 12, side walls 14, a front wall 16 and a back wall 18. The cabinet's bottom wall 20 supports an air blower 22 abutting the front wall 16. An opening 24 in the front wall 16 provides an air outlet for the air flow ejected from the blower 22. The air outlet can also be provided in the top wall 12, so the air flow from the blower can move upwardly as indicated by the arrow "A". The air enters the blower through the inlet opening 26 in the direction indicated by the arrow "B".

A return air compartment 28 and a by-pass air compartment 30 supply the air for the blower operation.

The return air compartment 28 includes an air damper 32 abutting the bottom wall 20 and an enclosure wall 34 connecting the top 36 of the air damper 32 with the bottom opening 38. The bottom opening 38, in the compartment 28 and bottom wall 20, facilitates communication between the return air ductwork (not shown) and the compartment 28. The sloping enclosure wall 34 and the damper 32 form a trihedral body with a substantially right-triangular shape in cross-section.

The second air compartment 30 includes an in-line damper 40 located in the corner between the top wall 12 and back wall 18. An exit opening 42 is formed by the cover wall 44 tapering from the back wall 18 and the damper 40. The exit opening 42 has approximately the same area as a free damper area which is an area unobstructed by blades 46 or other elements of the damper 40. In other words, when the blades 46 are in a horizontal position, as shown in the drawing, the air coming from the by-pass duct (not shown) and entry opening 48 in the back wall 18, and across the damper 40, passes through the maximum free area within the damper.

The tapering cover wall 44 provides a smooth transition from the outer perimeter of the damper 40, which is larger than the free area therewithin, to the exit opening 42. Such transition slightly increases the speed of the discharged air flow and ductwork friction losses without any significant impact on the air supply efficiency of the system.

A gas fired burner 50, located near the back wall 18 and in the passage 52, radiates the heat toward the top wall 12 along the path indicated by the arrow "C". The passage 52, formed by the tapering wall 44 and the sloping enclosure wall 34, guides the radiating heat at an angle relative to the blower 22. The exit opening 42 leading from the air compartment 30 is disposed between the burner 50 and the air damper 32. The air exiting from the return air compartment 28 and by-pass air compartment 30 is heated by the heat radiating from the burner as it comes from the passage 52. The blades 54, adjustably regulating the amount and discharge angle of the air flow emanating from the compartment 28, help to guide the air flow toward the blower inlet opening 26. A diagonal air flow from the burner 50 toward the top of the blower 22 facilitates more efficient heating of the air in the cabinet 10.

One of the advantages of the subject invention is the reduction of the sheet metal volume and work related thereto by bringing the top wall 12 closer to the top of the blower, placing the burner in the cabinet bottom corner for diagonal heat radiation, bringing the two air compartments closer to each other, and diminishing the size of the by-pass air compartment 30.

The overall sheet metal reduction of approximately 20% in comparison to conventional furnaces of this kind is achieved without sacrifice of the system's efficiency.

A further advantage of the novel furnace is protection of the blower motor 56 located near the cabinet bottom wall 20 from overheating. The return air compartment 28, and particularly the space differential between the top of the air damper 32 and the burner 50, prevents direct radiation of the motor 56, thereby prolonging its service life and reducing the cost of maintenance and spare parts.

The novel direct-fired make-up furnace provides for a more compact and aesthetically appealing unit which prolongs service life of the furnace and lowers the cost of sheet metal and labor.

While one embodiment of the invention has been illustrated and described herein, various changes and modifications may be made therein without departing from the spirit of the invention as defined by the scope of the appended claims.

What is claimed is:

1. An air furnace comprising:
   a housing including an air blower having a drive motor, said blower and drive motor being mounted in said housing;
   an air compartment in said housing formed by an air damper and enclosure wall;
   a heat generating device in said housing exuding radiant heat toward said blower;
   said air compartment substantially blocking direct heat radiation from said heat generating device to the drive motor of said blower and serving as guiding means for the air entering said blower.

2. The furnace of claim 1, and another air compartment forming a passage with said enclosure wall for guiding said heat radiation toward said blower.

3. The furnace of claim 1, wherein said heat generating device is a gas fired burner.

4. The furnace of claim 1, wherein said another compartment includes an in-line damper secured to said cabinet 5. The furnace of claim 1, wherein said enclosure wall is inclined relative to said blower.

6. The furnace of claim 2, wherein said passage is inclined and guides said radiating heat toward the top of said blower.

7. The furnace of claim 2, and an in-line damper forming one side of said compartment;
   said compartment including an exit opening having approximately the same area as a free area within said damper.

8. The furnace of claim 7, wherein both said exit opening and said damper face said air blower.

9. The furnace of claim 7, wherein said exit opening is located between said burner and said air damper.

10. The furnace of claim 2, and an in-line damper attached to said cabinet and a tapering duct having an exit opening which is parallel to said in-line damper.

11. An air furnace comprising:
    a cabinet;
    an air blower having a drive motor within said cabinet;
    first and second air compartments in said cabinet forming a passage therebetween, said passage including a gas burner;
    said first compartment and said passage being positioned to prevent direct heat radiation from said gas burner to the drive motor of said blower.

12. The furnace of claim 11, wherein each of said compartments includes a damper for controlling a volume of air flow passing through said compartments.

13. The furnace of claim 11, wherein said burner is located near one wall of said cabinet and pointed substantially toward the top of said cabinet.

14. The furnace of claim 11, wherein an air exit opening of said second compartment is positioned between said burner and a damper of said first compartment.

15. The furnace of claim 11, wherein said passage is angled relative to said blower.

16. The furnace of claim 11, wherein said first chamber has a damper disposed between said blower and said second compartment.

17. The furnace of claim 11, wherein said second compartment is a by-pass air compartment which has an exit opening having an area being smaller than an entry opening for the incoming air.

18. The furnace of claim 11, wherein said first compartment has a substantially triangular cross-section.

19. An air furnace comprising:
    a cabinet, an air blower, and a gas burner generating radiant heat in said cabinet;
    first and second air compartments in said cabinet forming a passage therebetween, said passage being at an angle to the horizontal, with said first compartment, and said passage being positioned to prevent direct heat radiation from said burner to said blower;
    and said second compartment having an exit opening of substantially the same area as the free area of said in-line damper.

20. An air furnace comprising:
    a housing;
    an air blower within said housing;
    return and bypass air compartments within said housing for providing air to said air blower;
    a radiant burner within said housing for heating air provided to said air blower, said radiant burner being positioned in a radiant burner passage adjacent to the bypass air compartment, said radiant burner and radiant burner passage being positioned at an inclined angle to the horizontal; and
    an in-line damper for the bypass air compartment, said bypass air compartment having an exit opening for introducing air into the housing and an inlet opening for introducing air into the bypass air compartment, said in-line damper being positioned at said air inlet opening and having a free area substantially the same as the area of the exit opening, and wherein said bypass air compartment, said radiant burner, said radiant burner passage, and said return air compartment are positioned on a side of the housing opposite the side where said blower is located and wherein said radiant burner passage is located below said bypass air compartment and above said return air compartment.

21. The air furnace of claim 20, wherein said raidant burner is a gas burner.

22. The air furnace of claim 21, wherein said blower contains a drive motor, and said return air compartment substantially blocks direct radiation of heat from said radiant burner and said radiant burner passage to the drive motor of said blower.

* * * * *